United States Patent
Kamiya et al.

(10) Patent No.: US 11,418,484 B2
(45) Date of Patent: Aug. 16, 2022

(54) DOCUMENT MANAGEMENT SYSTEM

(71) Applicant: FUJIFILM BUSINESS INNOVATION CORP., Tokyo (JP)

(72) Inventors: Shigeki Kamiya, Tokyo (JP); Tetsuo Iyoda, Ashigarakami-gun (JP); Akio Yamashita, Yokohama (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 310 days.

(21) Appl. No.: 16/520,580

(22) Filed: Jul. 24, 2019

(65) Prior Publication Data
US 2020/0314063 A1 Oct. 1, 2020

(30) Foreign Application Priority Data
Mar. 25, 2019 (JP) .............................. JP2019-056032

(51) Int. Cl.
*H04L 9/40* (2022.01)

(52) U.S. Cl.
CPC ........ *H04L 63/0209* (2013.01); *H04L 63/102* (2013.01); *H04L 63/083* (2013.01); *H04L 63/0823* (2013.01); *H04L 63/0876* (2013.01)

(58) Field of Classification Search
CPC .............. H04L 63/0209; H04L 63/102; H04L 63/0823; H04L 63/083; H04L 63/0876
See application file for complete search history.

(56) References Cited

U.S. PATENT DOCUMENTS

| | | | | |
|---|---|---|---|---|
| 8,613,108 B1* | 12/2013 | Aggarwal | ............... | G06F 21/10 726/29 |
| 8,819,420 B1* | 8/2014 | McKeeman | ........ | G06F 21/6218 713/165 |
| 10,341,353 B1* | 7/2019 | Yaacoby | ............. | H04L 63/0428 |
| 10,445,571 B1* | 10/2019 | Gaeta | .................. | G06F 3/04842 |
| 10,970,895 B1* | 4/2021 | Knas | .................... | G06V 40/176 |
| 2002/0107973 A1* | 8/2002 | Lennon | ............... | G06F 16/9577 709/231 |

(Continued)

FOREIGN PATENT DOCUMENTS

| JP | 2018-156383 A | 10/2018 |
|---|---|---|
| JP | 2018-156409 A | 10/2018 |

(Continued)

OTHER PUBLICATIONS

Mar. 29, 2020 Office Action issued in Australian Patent Application No. 2019208267.

*Primary Examiner* — Jason Chiang
(74) *Attorney, Agent, or Firm* — Oliff PLC

(57) ABSTRACT

An information processing system includes: one or more internal devices that are connected to an internal network, the internal network being connected to an external network through a firewall; and an intermediation device that can communicate with the internal network and the external network; each of the internal devices including: a storage unit that stores one or more documents and metadata of each of the documents; and a request acceptance unit that accepts, from a user, a request for processing by an external server on the external network as to one of the documents stored in the storage unit, and transmits the accepted request to the intermediation device; the intermediation device including: a request transmission unit as defined herein.

19 Claims, 6 Drawing Sheets

(56) References Cited

U.S. PATENT DOCUMENTS

| | | | |
|---|---|---|---|
| 2005/0050345 A1* | 3/2005 | Dowdy | G06F 21/10 |
| | | | 713/193 |
| 2006/0272026 A1* | 11/2006 | Niwano | G06F 21/10 |
| | | | 726/27 |
| 2007/0083467 A1* | 4/2007 | Lindahl | H04N 21/85406 |
| | | | 705/50 |
| 2008/0114786 A1* | 5/2008 | Nir | G06F 16/31 |
| 2008/0256086 A1* | 10/2008 | Miyoshi | G06F 16/40 |
| 2010/0088317 A1 | 4/2010 | Bone et al. | |
| 2011/0055356 A1* | 3/2011 | Nonaka | G06F 21/608 |
| | | | 709/219 |
| 2011/0219229 A1* | 9/2011 | Cholas | H04L 9/32 |
| | | | 713/168 |
| 2012/0017282 A1* | 1/2012 | Kang | H04N 21/8456 |
| | | | 726/26 |
| 2015/0088968 A1 | 3/2015 | Wei et al. | |
| 2015/0350712 A1* | 12/2015 | Sarosi | H04N 21/6587 |
| | | | 725/28 |
| 2017/0093572 A1* | 3/2017 | Hunt | G06Q 20/3829 |
| 2017/0286414 A1* | 10/2017 | Roebuck | G06V 30/416 |
| 2017/0293766 A1* | 10/2017 | Schnjakin | G06F 21/335 |
| 2018/0189292 A1* | 7/2018 | Grace, Jr. | G06F 16/24578 |
| 2018/0267965 A1* | 9/2018 | Iyoda | G06F 16/93 |
| 2018/0268155 A1* | 9/2018 | Kamiya | H04L 9/3297 |
| 2018/0268157 A1 | 9/2018 | Kamiya et al. | |
| 2019/0199759 A1* | 6/2019 | Anderson | H04L 67/306 |
| 2020/0314063 A1* | 10/2020 | Kamiya | H04L 63/0428 |

FOREIGN PATENT DOCUMENTS

| | | |
|---|---|---|
| JP | 2018-156410 A | 10/2018 |
| JP | 2018-156411 A | 10/2018 |
| WO | 2012/158654 A2 | 11/2012 |

* cited by examiner

| ID | ITEM |
|---|---|
| 1 | APPLICATION ID |
| 2 | INQUIRY ADDRESS OF EXTERNAL APPLICATION SERVER |
| 3 | ACCESS KEY |
| 4 | CONTRACT CLASSIFICATION INFORMATION |
| 5 | EXPIRATION TIME |
| 6 | CHARGING CONDITION INFORMATION |

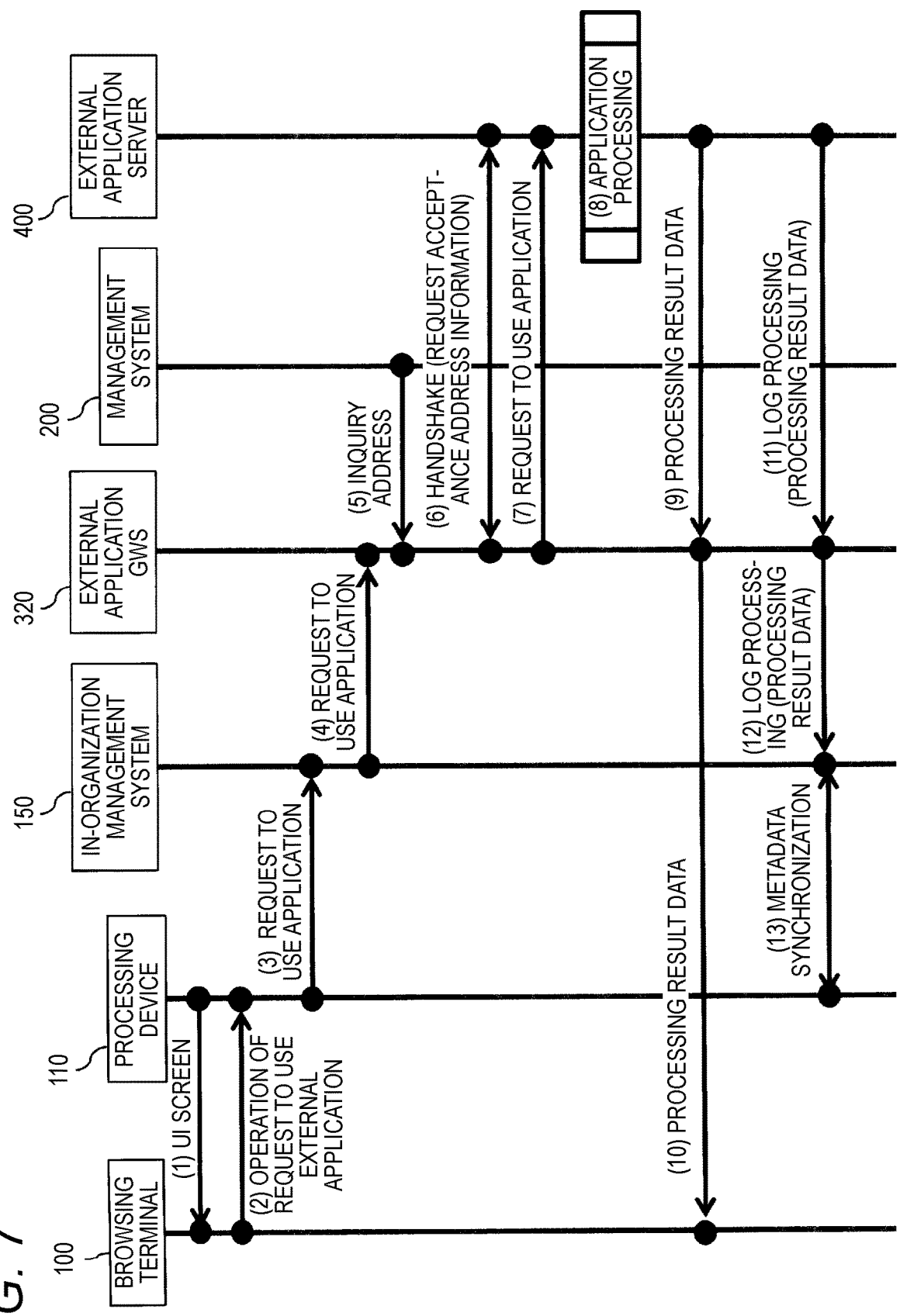

DOCUMENT MANAGEMENT SYSTEM

CROSS-REFERENCE TO RELATED APPLICATIONS

This application is based on and claims priority under 35 USC 119 from Japanese Patent Application No. 2019-056032 filed on Mar. 25, 2019.

Background

1. Technical Field

The present invention relates to an information processing system.

2. Related Art

The applicant has proposed a document management system including a two-layer structure consisting of a management device (or a management system) and a plurality of processing devices (see JP-A-2018-156409, JP-A-2018-156410, JP-A-2018-156411 and JP-A-2018-156383). Each processing device mainly carries out processing for protecting a document registered in this system by encryption or the like, and processing for distributing the protected document obtained by the above processing to a user. The management device manages the processing devices, stores metadata of protected documents produced by the processing devices, and provides the stored metadata. Each user is registered in one of the processing devices set as a home of the user. For example, the processing devices are placed for units such as divisions of a company respectively, and users belonging to one of the units are registered in a processing device placed in the unit.

A protected document of a document registered in the system by a user is stored in a processing device set as a home by the user. Then, through the processing device set as the home of the user or through another processing device registered as safe for the processing device set as the home of the user, the protected document is transmitted to a terminal of a user who is a transmission destination designated by the user registering the document and who makes a request to distribute the document. The protected document is stored in the processing device where the document has been registered and the terminal of the user designated as the transmission destination. However, the protected document is not stored in the management device, any other processing device or any other terminal.

On the other hand, metadata of a protected document holds information of users having permission such as permission to browse the protected document. The information about the permission is registered or changed in the system through a processing device by a authorized person such as a user (registrant) who has registered the protected document in the system. When a terminal receives an instruction to browse a protected document within the terminal from a user operating the terminal, the terminal acquires latest metadata corresponding to identification information of the protected document from a processing device in the vicinity of the terminal, and determines whether the user has permission to browse the protected document now or not, based on the acquired latest metadata. When determining that the user has permission to browse the protected document, the terminal decodes the protected document by use of a key information in the metadata, and displays the decoded document. Otherwise the terminal informs the user of the fact that the user cannot browse the document.

As has been described above, the system can prevent a protected document from being easily delivered to a third party, due to a mechanism in which the protected document is held in only the processing device set as the home of the user who has registered the protected document and terminals of users designated as transmission destinations by the user who has registered the protected document.

SUMMARY

There is a service in which an external server on an external network outside a firewall executes processing on a document stored in an internal device on an internal network inside the firewall. Such processing may require not only information belonging to the internal device about the document but also information belonging to a device on the external network.

Aspects of non-limiting embodiments of the present disclosure provide a mechanism allowing an external server to carry out processing on a document stored in an internal device even when the external server requires not only information belonging to the internal device but also information belonging to a device on an external network in order to carry out the processing.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing system comprising: one or more internal devices that are connected to an internal network, the internal network being connected to an external network through a firewall; and an intermediation device that can communicate with the internal network and the external network; each of the internal devices including: a storage unit that stores one or more documents and metadata of each of the documents; and a request acceptance unit that accepts, from a user, a request for processing by an external server on the external network as to one of the documents stored in the storage unit, and transmits the accepted request to the intermediation device; the intermediation device including: a request transmission unit that receives the request, acquires, from the external network, at least one data item among a plurality of data items required by the external server to execute the request, acquires another one or more of the data items through the internal network from the internal device transmitting the request, and transmits requested data including the acquired plurality of data items to the external server.

BRIEF DESCRIPTION OF DRAWINGS

Exemplary embodiment(s) of the present invention will be described in detail based on the following figures, wherein:

FIG. 7 is a chart illustrating a flow of use of the external application in the system according to the exemplary embodiment by way of example.

DETAILED DESCRIPTION

<Illustration of System to which Control of Exemplary Embodiment is Applied>

Figure 1:
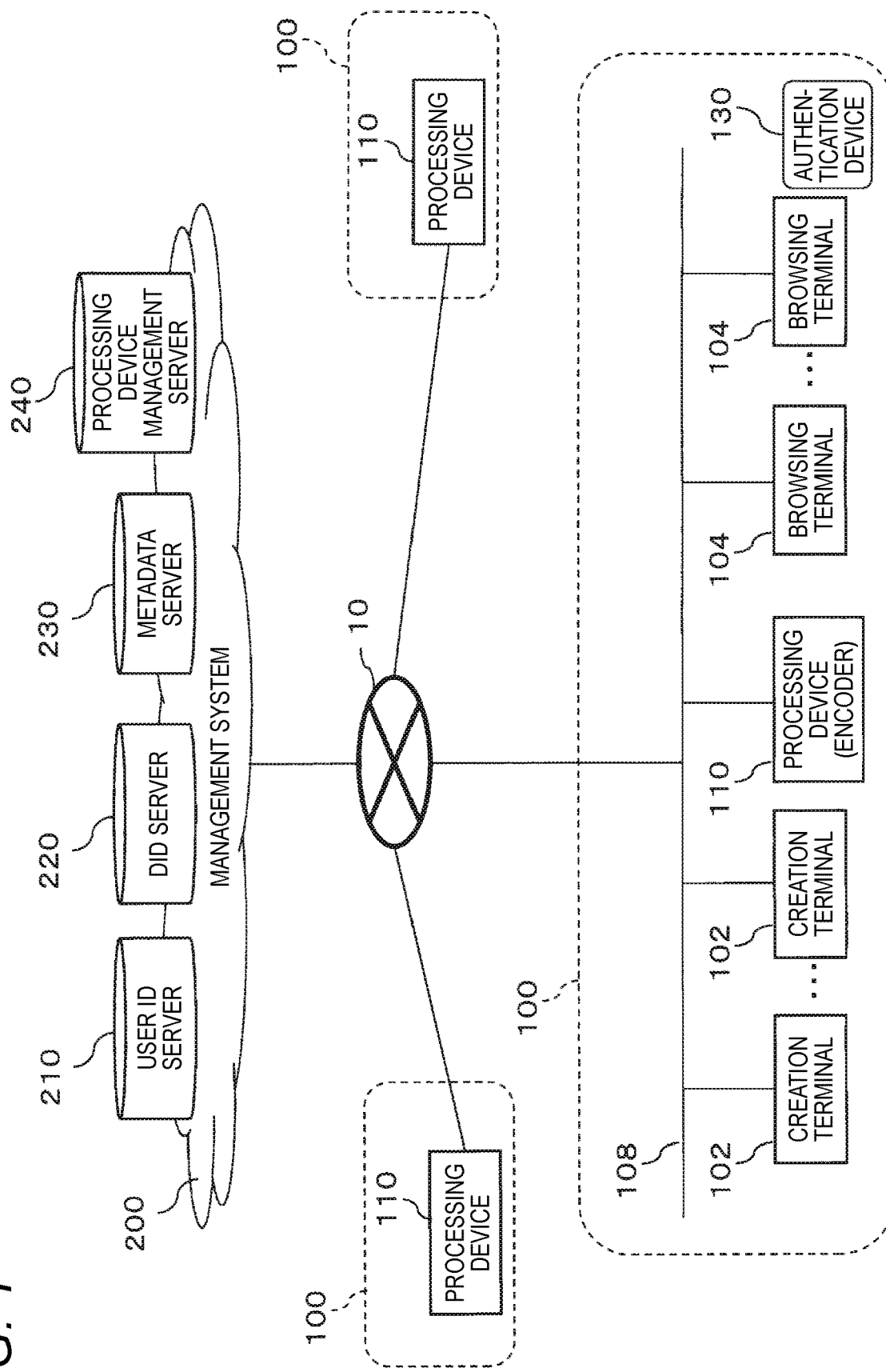
FIG. 1 is a diagram illustrating an example of a document management system to which a mechanism according to an exemplary embodiment is applied.
Figure 2:
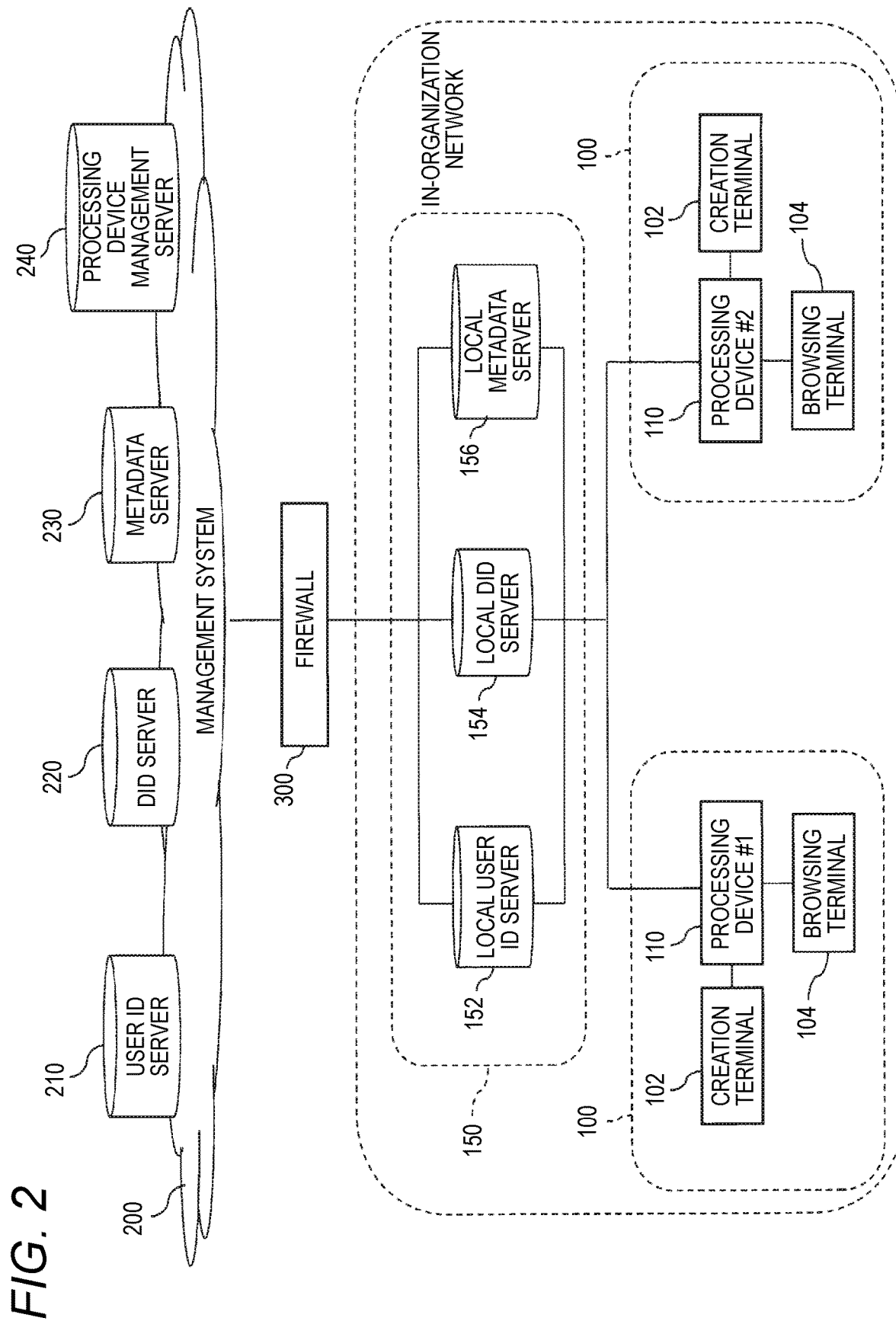
FIG. 2 is a diagram illustrating an example of a system configuration in which an in-organization management system is provided.

FIG. 1 and FIG. 2 show a schematic configuration of a document management system to which a system according to an exemplary embodiment of the invention is applied, by way of example. The system shown in FIG. 1 and FIG. 2 is similar to the systems shown in JP-A-2018-156409, JP-A-2018-156410, JP-A-2018-156411 and JP-A-2018-156383. Here, schematic description will be made. Refer to JP-A-2018-156409, JP-A-2018-156410, JP-A-2018-156411 and JP-A-2018-156383 as to the details of those systems.

The document management system illustrated in FIG. 1 and FIG. 2 provides an environment in which electronic documents (hereinafter also referred to as documents) can be used securely so that a risk of leakage of information about the documents can be reduced. Here, each document is content data which is distributable as one unit (such as one file). The kind of the data is not particularly limited. For example, the concept of the documents includes text data, document data created by word processor software, spreadsheet data created by spreadsheet software, CAD (Computer Aided Design) data, image data, movie data, sound data, multimedia data, page data displayed by a web browser, data to be created, edited and browsed on a PC and to be printed out, and so on.

The document management system in FIG. 1 includes a plurality of local systems 100, and a management system 200 for managing the local systems (particularly for managing processing systems which will be described later). The management system 200 can communicate with each local system 100 through a wide area network 10 such as the Internet.

Each local system 100 includes at least one creation terminal 102 connected to a local network 108, at least one browsing terminal 104, and a processing device 110. The local network 108 is a private network (for example, built as a LAN) provided in an organization such as a company. The local network 108 is protected from the wide area network 10 by a firewall or the like. Fundamentally, one processing device 110 is placed in each local system 100. When the private network in the organization has a large scale, individual network segments forming the private network may be regarded as local systems 100 respectively, and one processing device 110 may be placed in each of the local systems 100.

The creation terminal 102 is a terminal serving for creating a document. Examples of the creation terminal 102 include a desktop type or notebook type personal computer, a work station, a tablet terminal, a smartphone, a complex machine, a scanner, a facsimile machine, a digital camera, etc. An application for creation, edition, etc. of a document is installed in the creation terminal 102. In addition, software for requesting the document management system to distribute the created document is installed in the creation terminal 102. It can be considered that the software may be implemented as a device driver for exchanging information with the processing device 110 which will be described later, a Web application, etc.

The processing device 110 executes protection processing in which a document created by the creation terminal 102 is converted into a protected document (hereinafter also referred to as "eDoc file"). The eDoc file has a form in which the document can be used in a secure environment provided by the document management system. The protection processing can be also regarded as processing for encoding the original document to the eDoc file. For this meaning, the processing device 110 is a kind of encoder. In the protection processing, the document is, for example, converted to data in a special format designed for the system of this exemplary embodiment, and encrypted in a form which can be decoded only by users designated as distribution destinations of the document. Either of the format conversion and the encryption may be carried out first.

In addition, the processing device 110 generates metadata of a protected document, and stores the created metadata in a database built therein, in association with the protected document. At the same time, the processing device 110 registers the meta data in the management system 200 which is a host system. The metadata includes bibliographic items of the protected document, information of distribution destinations, access permission information, key information with which each distribution destination can release encryption of the protected document, etc. Examples of the bibliographic items include an item of a DID of the document, an item of a user ID of a user (that is, distributor) who has registered the document in the system, an item of registration date and time (that is, encoding date and time), etc. Data may be imparted or updated to some of the items included in the metadata by a corresponding device or user in accordance with a function provided by the service. In addition, for example, a part of the items may be designated by the user who has given the document management system an instruction to register the document, while another part of the items may be generated by the processing device 110. Further, values of some items of the metadata may be set by the management system 200 or the browsing terminal 104. In addition, the processing device 110 transmits the generated protected document (eDoc file) to the browsing terminal 104 of each distribution destination designated by the user.

In the protected document, that is, the eDoc file, the original document has been converted and encrypted into a special format. The eDoc file is also referred to as an eDoc body. The protected document is an example of a document. To make it possible to browse the eDoc file, metadata corresponding thereto is required. A set of the eDoc file and the metadata constitutes a complete protected document which can be browsed. Such a set of an eDoc file and metadata corresponding thereto will be referred to as "eDoc".

A default processing device 110 of each user is determined for the user. The default processing device 110 is typically a processing device 110 which is placed in a department the user belongs to. In a typical use scene, the user registers, in the processing device 110, a document to be shared with other users within the department the user belongs to, and distributes the document to the other users. The default processing device 110 of the user is registered in a user ID server 210 so as to be associated with the user ID of the user. When the user issues a request for registration of a document to another processing device 110 than the default processing device 110, the processing device 110 receiving the request converts the document to a protected document, generates metadata thereof, and registers the metadata in the management system 200. At the same time, the processing device 110 receiving the request transfers the protected document and the metadata to the default processing device 110 of the user. The default processing device 110 stores the protected document and the metadata transferred thereto, into the database built therein. On the other hand, the processing device 110 which is a transfer source device deletes, from its own storage, the protected document and the metadata which have been transferred to the default processing device 110. In this manner, the protected document registered by the user is stored in only the default processing device 110 of the user.

The browsing terminal 104 is a terminal serving for browsing a protected document (eDoc file). The word "browsing" mentioned herein means that a protected document is used in a form corresponding to information contents expressed by the document. For example, when the protected document includes a document such as word processor data or a drawing as information contents, browsing means that the user reads or views the document displayed by the browsing terminal 104. When information contents expressed by the protected document are sound, browsing means that the user listens to the sound reproduced by the browsing terminal 104. The browsing terminal 104 is implemented by a viewer application for browsing the protected document. The viewer application is, for example, installed in a general-purpose computer such as a desktop type or notebook type personal computer, a work station, a tablet terminal, a smartphone, etc. Alternatively, a terminal dedicated to browsing, such as an electronic book terminal, which has a function similar to the viewer application, may be used as the browsing terminal 104. The viewer application has a function of decoding the encrypted protected document by use of information of the metadata, or a function of decoding data expressed in a special format for the protected document to readable data. Incidentally, a computer which does not have a viewer application corresponding to the document management system cannot decode the data in the special format to readable data.

An authentication device 130 carried by a user using the document management system is used as a tool for authenticating the user. The authentication device 130 is a device like an IC card, which internally has identification information unique to the user who carries the device, and executes data processing for authenticating the user in accordance with a request from an external device. The authentication device 130 may be a portable terminal such as a smartphone internally having a function similar to such an IC card for personal authentication. The browsing terminal 104 or the creation terminal 102 has a function of communicating with the authentication device 130 by use of a wireless communication protocol such as NFC (Near Field Communication). The browsing terminal 104 or the creation terminal 102 exchanges information for user authentication along a predetermined protocol with the authentication device 130 to authenticate the user who carries the authentication device 130. An alternative manner may be used, in which the server side of the document management system, for example, the processing device 110 or the management system 200 may carry out actual user authentication while the browsing terminal 104 or the creation terminal 102 mediates data transfer between the server side and the authentication device 130. Further, a function as the authentication device 130 may be built in the browsing terminal 104 or the creation terminal 102.

The management system 200 manages the processing devices 110 within each local system 100. In addition, the management system 200 manages meta data of protected documents generated by those processing devices 110, and provides the metadata to the browsing terminals 104 in accordance with their requests. The management system 200 is constituted by a single computer or a plurality of computers which can communicate with one another. The management system 200 has functions as a user ID server 210, a DID server 220, a metadata server 230, and a processing device management server 240.

The user ID server 210 is a server for managing information of individual users who use the document management system. The users who use the document management system can be divided into two classes. One of the classes is a class of contractors who have contracted with an administrator of the document management system in order to use the system. The other is a class of general users who register or browse documents by actual use of the system under the contraction of the former class. For example, it is considered that there are many cases as follows. That is, a company is a contractor, and processing devices 110 are placed in a local network 108 of the company. Members of the company use, as general users, the document management system through the processing devices 110. The user ID server 210 holds information about the contractor and the general users individually.

The DID server 220 manages a DID (Document ID) which is an identification information (ID) of each protected document. In fact, a DID is given to a protected document by a processing device 110 where the protected document was generated. The DID server 220 grants permission to issue DIDs to each processing device 110 and sets a limit of issues (number of issues) for the processing device 110. The DID server 220 receives reports of DIDs issued actually by the processing device 110 within the issuing permission and the limit of issues, and records the received reports. Thus, the DID server 220 can suppress occurrence of an unauthorized DID and detect a document having an unauthorized DID.

The metadata server 230 holds and manages the metadata of the protected documents (eDoc files) generated by the processing devices 110. In a case where a request of metadata of a protected document is issued from a user through a browsing terminal 104, the metadata server 230 provides the metadata to the browsing terminal 104 when the user is a legitimate person. Incidentally, the user who issues a request for metadata is a "legitimate person" for the metadata server 230 when the combination of the user and the browsing terminal 104 the user used for issuing the request corresponds to a combination of a distribution destination user and a distribution destination browsing terminal 104 shown in distribution destination information in the meta data held by the metadata server 230 in association with the DID (included in the request) of the eDoc file.

The processing device management server 240 is a server for managing a status (state) of each processing device 110.

A flow of processing in the system of FIG. 1 will be described schematically.

A user who wants to register (that is, wants to distribute) a document in the document management system logs in a creation terminal 102 by use of an authentication device 130 or the like, and makes an instruction to register the document. From documents held in the creation terminal 102, the user selects one to be registered in the document management system, and makes an instruction to register the selected document.

In response to the instruction, the creation terminal 102 accepts an input as to, of attribute data for the selected document, an item the user should designate (such as a distribution destination of the document). Here, as the distribution destination, the creation terminal 102 may accept designation of a combination of a user and a browsing terminal 104. In this case, when a combination of a user and a browsing terminal 104 used to browse a document by the user coincides with the combination designated as the distribution destination, the user can browse the document.

The creation terminal 102 transmits, to the processing device 110, attribute data including the attribute item such as the distribution destination inputted by the user and other attribute items (such as information of a registrant, creation date and time, etc.) created by the creation terminal 102 itself, together with data of the document.

The processing device 110 applies protection processing to the document to be registered, which has been received from the creation terminal 102. Thus, the processing device 110 generates a protected document (eDoc file). In this creation, the received document is encoded to a special format for the document management system, and the encoded data is encrypted using a generated cryptographic key, so as to generate the eDoc file. The encoding and the encryption may be performed in reverse order. In addition, the processing device 110 gives a unique DID to the eDoc file. The generated DID is incorporated in the eDoc file (for example, as one item of properties of the file).

In addition, the processing device 110 generates metadata corresponding to the generated eDoc file. The metadata includes the attribute data received from the creation terminal 102 together with the document, and values of attribute items (for example, a DID, an ID of the processing device itself, encoding date and time, cryptographic key information) generated by the processing device 110 itself. The cryptographic key information included in the metadata is information indicating a key for releasing encryption of the eDoc file. When a common key is used for the encryption, the cryptographic key information is information indicating the common key. However, when the common key itself is included in the metadata in a plain text format, there is a fear that the common key may be abused by wiretapping or intercepting. Therefore, the common key is incorporated in the metadata, as cryptographic key information in which the common key has been encrypted by a public key of the distribution destination user.

In addition, the processing device 110 stores the eDoc file and the metadata generated thus, into the database built therein.

The processing device 110 transmits the generated metadata to the management system 200 so as to register the metadata therein. The management system 200 (metadata server 230) stores the received metadata. Incidentally, according to control peculiar to the exemplary embodiment, the processing device 110 transmits not entity data as to all the items of the generated metadata but entity data as to only a group of predetermined (that is, determined in advance) parts of the items to the management system 200, as will be described later in detail.

The processing device 110 distributes the generated eDoc file to browsing terminals 104 designated as distribution destinations. This distribution is carried out through the local network 108 within the local system 100.

Since the eDoc file received by each browsing terminal 104 is protected by encryption or the like, the eDoc file cannot be browsed as it is. A user who wants to browse the eDoc file in the browsing terminal 104 logs in the browsing terminal 104 and then makes an instruction to browse the eDoc file on a screen of the browsing terminal 104. The browsing terminal 104 which has received the instruction gains access to an accessible processing device 110 or the management system 200, and issues a request for metadata of the eDoc thereto. The request includes a DID of the eDoc.

The processing device 110 which has received the request acquires the latest version of metadata corresponding to the DID from the management system 200, and transmits the metadata to the browsing terminal 104. Incidentally, in the configuration where the management system 200 (particularly the metadata server 230) receives the request, the management system 200 transmits the latest version of the metadata corresponding to the DID to the browsing terminal 104. When a change is made in the metadata by user's operation on the processing device 110 (for example, to change the access permission information), the change is transmitted to the management system 200, and the management system 200 reflects the change on the metadata held by the management system 200 itself. In this manner, the management system 200 always has the latest version of the metadata of the protected document.

Here, the browsing terminal 104 which has received the instruction to browse the protected document requires, of the metadata, the distribution destination information and the access permission information immediately. Therefore, the processing device 110 or the management system may transmit only the access permission information to the browsing terminal 104 in accordance with a request thereof. Incidentally, the distribution destination information includes, for example, a list of user IDs designated as distribution destinations of the protected document. In addition, the distribution destination information may also include a list of pairs of user IDs and terminal IDs. On the other hand, the access permission information includes information indicating the contents of permission (for example, only permission to browse, permission to browse and edit, etc.) of each user in association with a user ID of the user included in the distribution destination information of the protected document. That is, the access permission information includes information of granted users who are destinations with granted access permission to an eDoc, such as permission to browse the eDoc. The access permission information is an example of authorized user information. When a user requests the browsing terminal 104 to browse an eDoc, the browsing terminal 104 issues a request for the latest metadata of the eDoc to the processing device 110, and examines access permission information in the metadata acquired thus. When it is found from the latest metadata that the user has access permission to the eDoc such as permission to browse the eDoc, the browsing terminal 104 displays the contents of the eDoc. When it is found that the user does not have access permission to the eDoc, the browsing terminal 104 rejects the request to display the contents of the eDoc.

On receiving the requested metadata, the browsing terminal 104 determines whether a combination of the browsing terminal 104 and the user who is using the browsing terminal 104 is included in the distribution destination information belonging to the metadata or not. When the combination is not included, the user is determined to have no permission to browse the eDoc in the browsing terminal 104. Accordingly, the browsing terminal 104 does not open the eDoc file, but displays an error message indicating that the user has no browsing permission. When the combination is included, the user is determined to have permission to browse the eDoc file in the browsing terminal 104. In this case, the browsing terminal 104 decodes the eDoc file by use of key information included in the metadata thereof, and outputs the eDoc file in a form corresponding to information contents of the decoded result thereof.

After metadata is registered in the management system 200 for the first time, distribution destination information or access permission information included in the metadata may be changed by a distributor or a person who has been authorized to change the distribution destinations (for example, a person who has been authorized to edit data). The processing device 110 has a function of accepting, from a distributor, an input or a change as to the access permission information defining the contents of access permission of each user to an eDoc file the distributor has registered. A user who was designated as a distribution destination at the time when an eDoc was created and registered may be excluded from the distribution destination due to a change made later. In this case, the browsing terminal 104 detects that fact from the distribution destination information included in the latest metadata acquired from the management system 200. Thus, the browsing terminal 104 does not display the eDoc file.

Although FIG. 1 shows a system having a two-layer structure including a group of processing devices 110 and the management system 200, another layer or other layers may be inserted into the management system so that the system has three or more layers. FIG. 2 illustrates a three-layer system.

In the example shown in FIG. 2, there are a plurality of local systems 100 in an in-organization network which is a private network of an organization such as a company. The in-organization network or the local network 108 for the local systems 100 is an example of an internal network.

An in-organization management system 150 is provided in the in-organization network. The in-organization management system 150 manages, of the document management system, processing in the organization and information required for the processing. That is, the management system 200 is operated by a service provider of the document management system so as to manage information and processing as to a plurality of organizations using the document management system, while the in-organization management system 150 manages, of the information and processing, parts relating to the organization the in-organization management system 150 belongs to, under the control of the management system 200.

The in-organization network is connected to the management system 200 on the Internet which is an example of an external network, through a firewall 300. For example, the in-organization network constitutes an extranet with the management system 200. The in-organization network is connected to the Internet through the firewall 300.

The in-organization management system 150 has a local user ID server 152, a local DID server 154 and a local metadata server 156.

The local user ID server 152 manages, of members belonging to the organization, information of users who have been registered in the document management system. The information of individual users held by the local user ID server 152 is similar to the information of general users held by the user ID server 210. When a user acquiring and using a processing device 110 (that is, a user setting the processing device 110 as a "default processing device") is registered in the processing device 110, the processing device 110 sends information of the registered user to the local user ID server 152 within the organization. The local user ID server 152 stores the received information of the user, and sends the information through the firewall 300 to the user ID server 210 of the central management system 200 on the Internet. The user ID server 210 maintains the received information of the user. In addition, when a change occurs in the information of a user registered in the processing device 110, an administrator or the like changes the information of the user on the processing device 110. The processing device 110 transmits information about the changed contents of the user information (for example, including a user ID, an item name of a changed information item, and a changed value of the item) to the local user ID server 152. The local user ID server 152 changes the information of the user maintained by the local user ID server 152 itself in accordance with the received contents of the change. In addition, the local user ID server 152 sends the received information of the changed contents to the central user ID server 210. The user ID server 210 changes the information of the user held by the user ID server 210 itself, in accordance with the information sent thereto.

The local DID server 154 receives and maintains DIDs issued from the processing devices 110 in each local system 100 belonging to the in-organization network of the organization. Information held by the local DID server 154 is similar to the information held by the DID server 220. In addition, the local DID server 154 sends the information of the DIDs received from the processing devices 110 to the central DID server 220. The DID server 220 maintains the information. In addition, permission to issue DIDs and a limit of issued DIDs are granted to the local DID serer 154 by the central DID server 220. Within the granted limit of issued DIDs and under the granted permission to issue DIDs, the local DID server 154 grants permission to issue DIDs and a limit of issued DIDs to each processing device 110 under the local DID server 154.

The local metadata server 156 receives metadata of eDocs generated by the processing devices 110 in each local system 100 belonging to the in-organization network of the organization, and maintains the received metadata. Information held by the local metadata server 156 is similar to the information held by the metadata server 230. In addition, the local metadata server 156 sends the metadata received from the processing devices 110 to the central metadata server 230. The metadata server 230 maintains the received metadata.

Exemplary Embodiment

A mechanism in which an application provided by a server outside a document management system can be applied to a protected document registered in the system will be described below.

Figure 3:
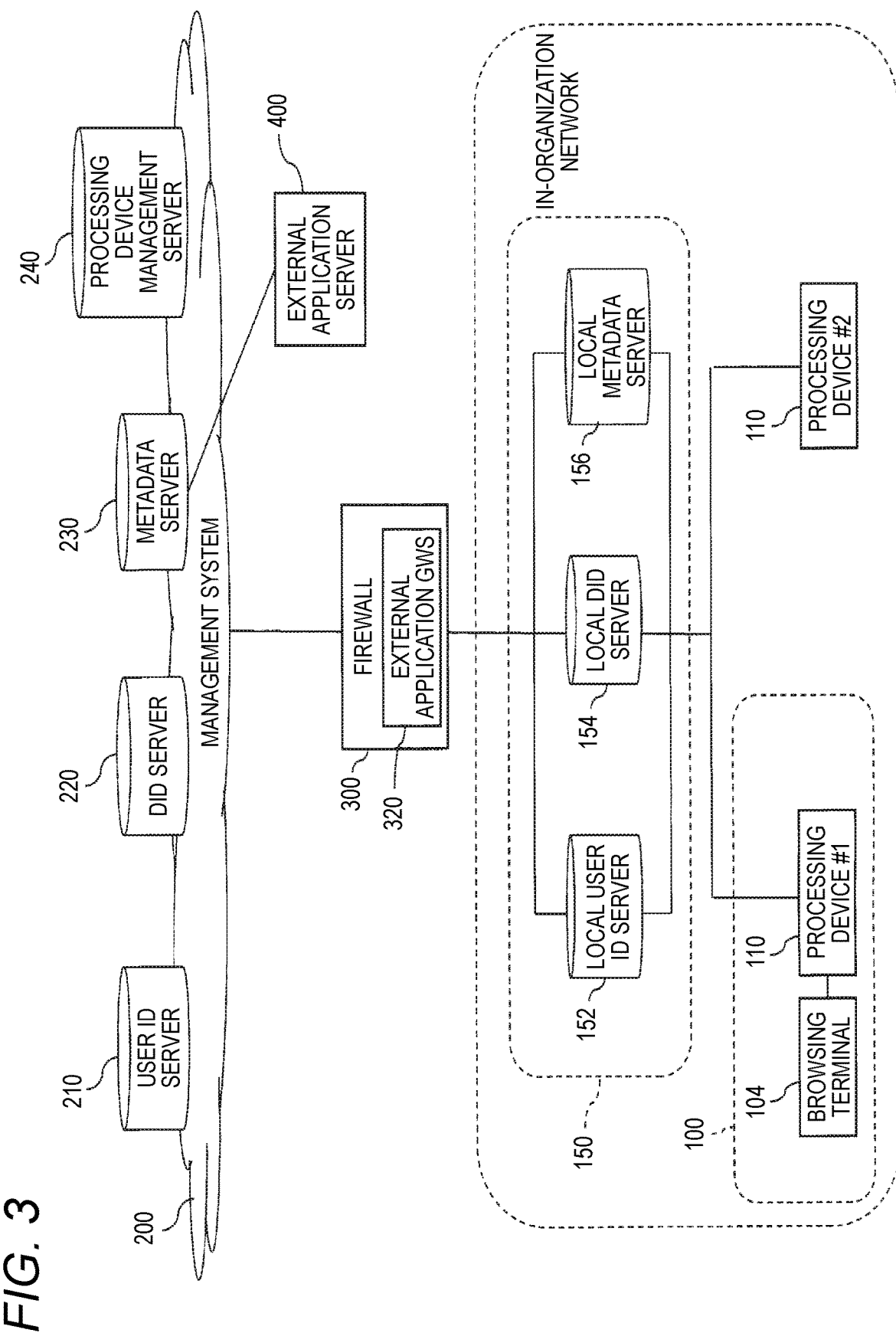
FIG. 3 is a diagram illustrating the configuration of the document management system according to the exemplary embodiment by way of example.

FIG. 3 is a diagram illustrating the configuration of the document management system according to the exemplary embodiment by way of example. The system illustrated in FIG. 3 is based on the system including a layer of the in-organization management system 150 illustrated in FIG. 2. However, this is merely an example. The method of the exemplary embodiment can be applied to a system having more layers or contrarily a system having only two layers of the local systems 100 and the management system 200 as illustrated in FIG. 1.

In the system of FIG. 3, the management system 200 on an external network such as the Internet is securely connected to an external application server 400 through the external network. The external application server 400 provides service for executing some application (that is, information processing) on a protected document or metadata thereof within the document management system. The external application server 400 is an example of an external server. Although only one external application server 400 is illustrated in FIG. 3, a plurality of external application servers 400 may provide various applications. Incidentally, the application provided by the external application server 400 will be referred to as an external application.

Examples of such external applications include an application for translating the document contents of an eDoc to a specific language, an application for generating a summary of the document contents of an eDoc, an application for analyzing metadata of an eDoc, etc. However, those are just examples.

The system of FIG. 3 has an external application GWS (gateway server) 320. The external application GWS (hereinafter also referred to as GWS simply) 320 is a gateway for safely and automatically intermediating between each user within the local system 100 and the external application server 400 to exchange a request to use an external application, data to be processed by the external application, data of a result processed by the external application, etc.

The external application GWS 320 is set so that the external application GWS 320 can communicate with both any device on the in-organization network which is an internal network and any device on the external network such as the Internet. In the example of FIG. 3, the external application GWS 320 is provided as an device within the firewall 300 to separate the in-organization network from the external network. However, this is just an example. It will go well only if the external application GWS 320 can communicate with both the in-organization network and the external network. The installation place of the external application GWS 320 is not limited to the inside of the firewall 300.

In the system of FIG. 3, elements relating to control according to the exemplary embodiment will be described below in detail.

<Processing Device>

Figure 4:
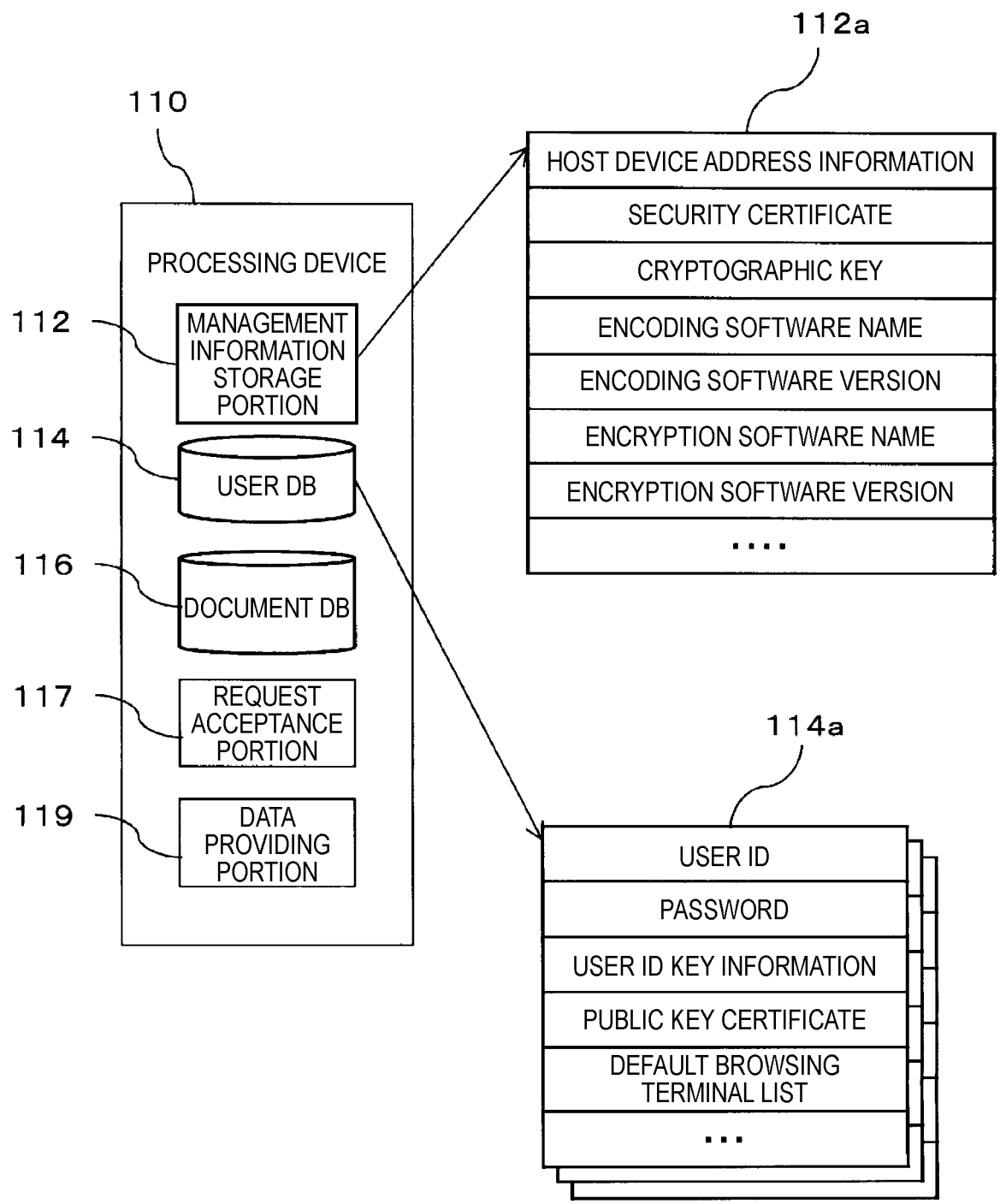
FIG. 4 is a diagram illustrating the internal configuration of a processing device by way of example.

FIG. 4 illustrates the configuration of the processing device 110 in detail by way of example. The processing device 110 is an example of an internal device. As shown in FIG. 4, the processing device 110 includes a management information storage portion 112, a user DB 114, a document DB 116, a request acceptance portion 117, and a data providing portion 119.

Management information 112*a* is stored in the management information storage portion 112. The management information 112*a* includes items such as host device address information, a security certificate, a cryptographic key, an encoding software name, an encoding software version, an encryption software name, an encryption software version, etc. The host device address information is information about a communication address (such as an IP address or URL) of each host device managing the processing device 110. Examples of such host devices include the management system 200, the servers 210 to 240 belonging to the management system 200, the in-organization management system 150, the servers 152 to 156 belonging to the in-organization management system 150, etc. The security certificate is a digital certificate serving for secure communication between the processing device 110 and another device on the network based on a public key infrastructure. The processing device 110 holds a security certificate of each host device with which the processing device 110 often communicates. In addition, the processing device 110 may hold a security certificate of each user who use the creation terminal 102 or the browsing terminal 104. The cryptographic key is a cryptographic key of the processing device 110, which, for example, serves for encryption or decoding when the processing device 110 communicates with another device on the network, or serves for digital signature (or generation of certificate information similar thereto) by the processing device 110. For example, the cryptographic key includes a pair of a private key and a public key granted to the processing device 110 in the public key infrastructure. The encoding software and the encryption software are encoding (conversion to a special format) and encryption programs installed in the processing device 110, respectively.

User information 114*a* of each user registered in the processing device 110 (that is, each user setting the processing device 110 as a "default processing device") is stored in the user DB 114. The user information 114*a* of each registered user includes items such as a user ID, a password, user ID key information, public key information, a default browsing terminal list, etc. The user ID key information is authentication information of the user to be used by the authentication device 130 of the user. The default browsing terminal list is a list of IDs of one or more browsing terminals to be mainly used by the user.

The document DB 116 stores each eDoc file generated by the processing device 110 and metadata corresponding to the eDoc file. Since the eDoc file and the metadata include DID information, the eDoc file and the metadata can be associated with each other. In addition, original data (received from the creation terminal 102) which has not been encoded to an eDoc yet may be registered in association with the DID of the eDoc. The document DB 116 is an example of a storage unit provided in the processing device 110 which is an example of an internal device.

The request acceptance portion 117 is an example of a request acceptance unit, which carries out processing to accept, from a user, a request to use an external application (hereinafter referred to as an application use request or a use request), and to transfer the accepted application use request to a host device, that is, the in-organization management system 150 in the example of FIG. 3. The transferred application use request is sent to the external application server 400 through the in-organization management system 150 and the external application GWS 320. In addition, the request acceptance portion 117 receives a processing result of the external application as a reply to the application use request, and provides the processing result to the user of the request source or reflects the processing result on the metadata in the document DB 116.

The data providing portion 119 executes processing for providing, to the external application, an eDoc file and/or metadata required by the external application requested by the user. The data providing portion 119 is an example of a data providing unit.

<External Application GWS>

Next, the function and configuration of the external application GWS 320 will be described with reference to FIG. 5 by way of example. The external application GWS 320 is an example of an intermediation device. The external application GWS 320 has a request transfer portion 322, a server request processing portion 324, and a processing result transfer portion 326.

The request transfer portion 322 transfers the application use request received from the user through the in-organization management system 150, to the external application server 400 which can execute the external application. The request transfer portion 322 is an example of a request transmission unit, and the application use request is an example of request data.

Here, in order to execute the external application appropriately, a group of data items required by the external application has to be included in the use request. The group of data items required for executing the external application may be within the in-organization network in some case, or may be on the external network in another case. Therefore, when the data items required for executing the external application are not included in the use request received from the user through the in-organization management system 150, the request transfer portion 322 acquires the data items from a device within the in-organization network or from a device on the external network. In this manner, the request transfer portion 322 has a function of acquiring data items which should be included in the application use request to be transferred to the external application, from a device (such as the processing device 110) on the in-organization network and from a device (such as the external application server 400 or the management system 200) on the external network. The application use request including the data items acquired thus is transmitted to the external application server 400.

On receiving the application use request from the external application GWS 320, the external application server 400 sends a data request to the external application GWS 320 in order acquire data required for executing the external application in accordance with the application request.

The server request processing portion 324 receives the data request from the external application server 400, and acquires data indicated by the data request, from a device (such as the processing device 110) within the in-organization network. In addition, the server request processing portion 324 transmits the acquired data to the external application server 400.

The processing result transfer portion 326 receives data of a processing result (referred to as processing result data) of the external application server 400 as a reply to the application use request, and transfers the processing result data to the processing device 110 which has accepted the application use request from the user. On this occasion, the processing result transfer portion 326 may transfer the processing result data directly to the processing device 110 or may transfer the processing result data along a path reverse to the path through which the application use request has been transferred. In the latter case, the processing result transfer portion 326 transfers the processing result data to the in-organization management system 150. The processing result transfer portion 326 is an example of a processing result transmission unit.

Here, a plurality of data items included in an application use request to be transferred to the external application server 400 will be described. In the exemplary embodiment, the application use request to be transferred to the external application server 400 has to include the following data items (a) to (e).

(a) request acceptance address information

The request acceptance address information is information indicating an acceptance address (such as URL) specially prepared by the external application server 400 in order to accept the application use request.

In the exemplary embodiment, when the external application GWS 320 sends an application use request to an external application server 400, the external application GWS 320 gains access to a known fixed inquiry address of the external application server 400, and executes handshake processing with the external application server 400. In the handshake processing, the external application server 400 generates an acceptance address unique to the application use request, and provides the acceptance address to the external application GWS 320. The external application GWS 320 sends an application use request to the acceptance address. Information indicating the acceptance address is the request acceptance address information. Incidentally, when the processing of the application use request is terminated, the external application server 400 invalidates the acceptance address (that is, the request acceptance address information) corresponding to the application use request. In this manner, a security risk that the acceptance address may be used by a third party can be reduced. The request acceptance address information is an example of address data generated temporarily by the external application server 400.

(b) address information of external application GWS 320 for external network

This address information is information indicating an address to be used when a device on the external network gains access to the external application GWS 320. The address information is expressed, for example, in a URL format.

The external application server 400 sends, to the external application GWS 320, processing result data as a reply to an application use request received from the external application GWS 320. On this occasion, the external application server 400 sends the processing result data to the address indicated by the address information. Also on the occasion that the external application server 400 issues a request to the external application GWS 320 for data required for processing of the application use request, the external application server 400 may send the request to the address designated by the address information.

The address information may be fixed. In addition, as the address information, the external application GWS 320 may generate address information special to the application use request in the same manner as the aforementioned request acceptance address information.

(c) access permission information to external application GWS 320

This access permission information is information indicating whether a user issuing an application use request can use the external application GWS 320 or not. The access permission information serves for determining whether the external application GWS 320 should accept the application use request from the user or not. In addition, when the application use request including the access permission information is sent to the external application server 400, a third party cannot impersonate the external application GWS 320 easily.

(d) application ID and access key

The application ID is identification information of an external application intended by an application use request. The access key is information indicating the available function and the available level of the external application. For example, a provider of an external application issues a license for use of the external application to an organization having an in-organization network. The license includes an access key. Based on the application ID and the access key included in the application use request, the external application server 400 recognizes which external application to be executed, and determines whether to provide the function required by the application use request (that is, whether to allow the user to use the function).

(e) request information

The request information is information to be a body of an application use request. The request information consists of at least one item expressing the contents of the application use request. The request information includes, for example, one or more items of a DID, a user ID, a metadata ID, an application function ID, etc. The DID is an ID of an eDoc to be processed by an external application relating to the application use request. The user ID is an ID of a user who has made the application use request. The metadata ID is identification information of metadata items to be processed by the external application relating to the application use request. The metadata ID is an example of metadata specifying information. The metadata items are items (such as a DID, a user ID, access permission information, key information, etc.) constituting metadata. A specific metadata item of a specific eDoc is specified by a combination of the DID of the eDoc and the metadata ID of the metadata item. Among the metadata items, there is an item for storing the processing result of the external application. In addition, the request information may include a terminal ID of a terminal (such as the browsing terminal 104) used by the user when the user issued the request to use the external application to the processing device 110. Each metadata item is an example of an element constituting the metadata. The metadata ID is an example of element identification information for identifying an element of the metadata uniquely.

The application function ID is identification information of a function of the external application requested to use in the application use request by the user who wants to use the external application. The application function ID is, for example, expressed by a combination of the identification information of the external application (that is, the application ID) and the identification information of the function requested to use by the user among one or more functions of the external application.

For example, a provider who provides an external application to the document management system of the exemplary embodiment is subjected to examination as to the external application by an administrator of the management system 200. When the provider passes the examination, an application ID is granted to the external application by the administrator. At the same time, an ID is also granted for each of one or more functions provided by the external application. In addition, for each function of the external application, an ID of a metadata item is also granted. The metadata item serves as a writing destination where a result of processing by the function should be written.

Of the group of the data items (a) to (e) described above by way of example, the data item (a) is acquired from the external application server 400 when the external application GWS 320 sends an application use request to the external application server 400. That is, the data item (a) is an example of a data item which is acquired from an external network by the external application GWS 320. The data item (b) is known or generated by the external application GWS 320 itself. The data item (c) is a piece of attribute information of a user. For example, the data item (c) is managed by the local user ID server 152 within the in-organization management system 150. In addition, since the processing device 110 allows a user to select an external application the user wants to use, the processing device 110 can grasp the application ID of the data items (d). In addition, the access key is managed in association with the application ID by the in-organization management system 150. Of the data items (e), each item of the DID, the user ID and the application function ID is specified when a use request for an external application is accepted from a user by the processing device 110. In addition, the metadata ID is determined in accordance with the specified application function ID (for example, in the in-organization management system 150).

Next, an example of management information of an external application held by the in-organization management system 150 will be described with reference to FIG. 6.

Figures 5, 6:
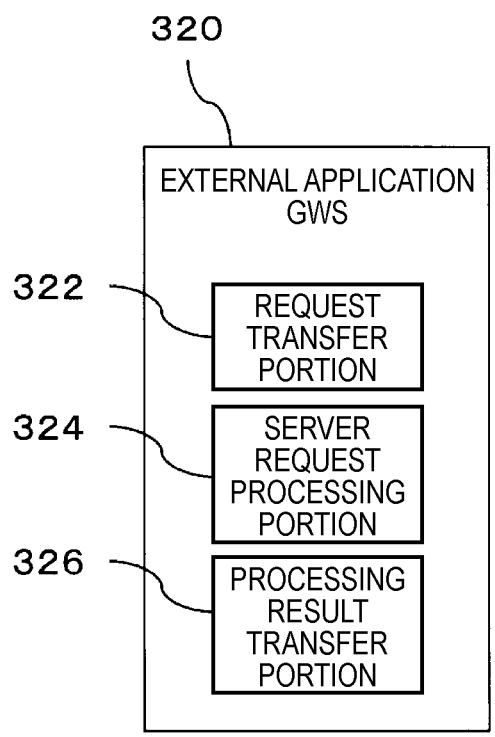
FIG. 5 is a diagram illustrating the internal configuration of an external application GWS by way of example.
FIG. 6 is a view illustrating management information of an external application managed by the in-organization management system by way of example.

The management information of an external application shown in FIG. 6 by way of example includes an application ID, inquiry address information of an external application server, an access key, contract classification information, expiration time, and charging condition information. The management information is created and managed for each of external applications provided by a group of external application servers 400. The application ID is identification information of the external application. The inquiry address information of the external application server is a fixed inquiry address (such as URL) of the external application server 400 executing the external application. As described previously, the external application GWS 320 gains access to the fixed inquiry address of the external application server 400, and acquires request acceptance address information serving as a transmission destination of an application use request. The external application GWS 320 acquires, from the in-organization management system 150, the information of the inquiry address of the external application server 400 corresponding to the application ID included in a use request issued by a user. The access key is an access key which has been acquired by the organization using the in-organization management system 150 as to the external application. The contents of the access key has been described previously. The contract classification information is information indicating the classification of a contract between the organization and a provider of the external application. The expiration time is an expiration time of the access key. The charging condition information is information providing how to add up charging about the external application in the organization (for example, whether to charge the user or charge a department the user belongs to).

Of the management information shown in FIG. 6 by way of example, the application ID and the inquiry address information of the external application server are not information unique to the organization. Therefore, the application ID and the inquiry address information of the external application server may be managed by the central management system 200.

Next, a flow of use of an external application will be described with reference to FIG. 6.

(1) In accordance with a request from a user, the processing device 110 provides a UI screen where the user can input an instruction to execute an external application, through a network to a browsing terminal 104 of the user. The UI screen may be, for example, a screen showing a list of eDocs to which the user has access permission and which are stored in the document DB 116 of the processing device 110.

(2) The user performs operation on the UI screen to request for use of an external application. For example, when the user selects one eDoc on the UI screen, a menu of processings which can be executed on the eDoc is displayed. The menu includes menu items indicating functions provided by a group of external applications, respectively. For example, assume that an external application called various language translation service provided by an external application server 400 provides a plurality of functions including a function of translation to Chinese and a function of translation to Arabic. In this case, menu items are provided for the functions respectively. Each of the menu items expressing the functions of the external application is associated with an external application function ID specifying the function uniquely. The external application function ID is, for example, expressed by a combination of an application ID of the external application and an ID of the function within the external application (for example, a serial number assigned to the function provided by the external application). Incidentally, some application may provide only one function. In this case, the external application function ID of the function may be the same as the application ID of the external application.

As described above, in one example, a user selects an eDoc and selects a function of an external application to be applied to the selected eDoc, on the UI screen. Thus, the contents of an instruction of the user to use the external application can be transmitted to the processing device 110.

(3) The processing device 110 generates an application use request along the contents of the instruction inputted by the user, and delivers the application use request to the host in-organization management system 150 for the processing device 110. The application use request includes data items including an user ID of the user, an external application function ID specifying a function of the external application selected by the user, and a DID of an eDoc to which the function should be applied. In addition, the application use request may include an ID of the processing device 110.

(4) To the application use request received from the processing device 110, the in-organization management system 150 adds, of data items to be included in the request, data items held by the in-organization management system 150 itself. For example, from an application function ID included in the application use request, the in-organization management system 150 obtains an application ID corresponding to the application function ID, and adds an access key corresponding to the obtained application ID to the application use request. Incidentally, this addition is not necessary when the application ID is included in the application function ID. In addition, the in-organization management system 150 selects an access key corresponding to the application ID from access IDs for application IDs held by the in-organization management system 150 itself, and adds the selected access key to the application use request. In addition, for each application function ID, the in-organization management system 150 holds an ID of a metadata item (that is, metadata ID) serving as a destination where a result of processing should be stored when the function of the external application indicated by the application function ID is executed. The in-organization management system 150 obtains a metadata ID corresponding to the application function ID included in the application use request, and adds the obtained metadata ID to the application use request. In addition, from the user ID included in the application use request, the in-organization management system 150 obtains access permission information to the application GWS corresponding to the user ID, and adds the obtained access permission information to the application use request. Then, the in-organization management system 150 transmits, to the external application GWS 320, the application use request to which necessary data items have been added thus.

(5) On receiving the application use request from the in-organization management system 150, the external application GWS 320 determines whether to accept or reject the application use request, based on the access permission information to the external application GWS 320 included in the use request. When it is determined to reject the use request, the external application GWS 320 sends an error message that the request cannot be accepted due to no permission, to the browsing terminal 104 of the user through the in-organization management system 150 and the processing device 110 or directly.

On the other hand, when it is determined to accept the application use request, the external application GWS 320 acquires, from the management system 200, information about a fixed inquiry address of an external application server 400 providing an external application corresponding to the application ID included in the application use request. In this example, assume that the information of the fixed inquiry address of the external application server 400 is managed by the management system 200. In this case, for example, when the inquiry address of the external application server 400 is changed for some reason, it will go well only if the change is reflected on the information managed by the central management system 200.

(6) The external application GWS 320 gains access to the acquired inquiry address, and performs handshake with the external application server 400. Thus, the external application GWS 320 receives, from the external application server 400, request acceptance address information which indicates a temporary address of a destination to which the application use request should be sent this time.

(7) The external application GWS 320 adds the request acceptance address information and address information of the external application GWS 320 itself for the external network, to the application use request received from the in-organization management system 150. Then the external application GWS 320 transmits the added application use request to the external application server 400. Data of the application use request transmitted on this occasion is protected by encryption of a transmission path between the external application GWS 320 and the external application server 400. Through the aforementioned processing, the application use request is transmitted to the address indicated by the request acceptance address information.

(8) The external application server 400 executes the external application in accordance with the application use request received from the external application GWS 320. This execution of the external application will be described later in detail.

(9) The external application server 400 transmits processing result data obtained by the execution of the external application, to the address of the external application GWS 320 for the external network included in the application use request. The processing result data is accompanied by information of a user ID included in the application use request and/or a terminal ID of the terminal used by the user.

(10) Using the user ID or the terminal ID accompanying the processing result data, the external application GWS 320 specifies the browsing terminal 104 of the user who is an issuing source of the application use request, and transmits the processing result data to the browsing terminal 104 through the in-organization network. The browsing terminal 104 displays the received processing result data on the screen.

(11) In addition, the external application server 400 transmits data for processing to record a log as to use of the external application (hereinafter referred to as log processing), to the external application GWS 320. The data includes the DID of the eDoc to which the external application has been applied, and the metadata ID specifying metadata items for storing the processing result data.

(12) The external application GWS 320 delivers the data for the log processing to the in-organization management system 150.

The in-organization management system 150 reflects the received data for the log processing on the local metadata server 156. That is, the in-organization management system 150 adds the information of the log included in the data for the log processing to the log information in the metadata of the eDoc processed by the external application. The log includes items such as the execution date and time of the external application, the ID of the external application server 400, the identification name of the executed external application, the ID of the user issuing the instruction, etc.

In addition, the data for the log processing received from the external application GWS 320 by the in-organization management system 150 includes the processing result data, a DID, and a metadata ID. The in-organization management system 150 writes the processing result data into a metadata item corresponding to the metadata ID in the metadata corresponding to the DID within the local metadata server 156.

(13) The in-organization management system 150 performs synchronous processing of the metadata with the processing device 110 accepting the application use request from the user. As a result, the contents of the metadata updated in the aforementioned step (12) (that is, addition of the log and the processing result data) are also reflected on the document DB 116 in the processing device 110.

Next, the processing of the external application server 400 in the aforementioned step (8) will be described further in detail.

The external application server 400 specifies a function of an external application to be executed, from an application function ID included in an application use request received from the external application GWS 320. In addition, when an eDoc or metadata to be intended is required for executing the specified function of the external application, the external application server 400 acquires the eDoc or the metadata.

For example, assume that the function is processing (translation) on the contents of the eDoc. In this case, the external application server 400 sends a document request to the external application GWS 320. The document request includes a DID included in the application use request. The DID is an example of document identification information for identifying a document uniquely. In addition, the document request may include a public key of the external application server 400. To the processing device 110 storing the eDoc corresponding to the DID (in this example, the processing device 110 which has accepted the application use request from the user), the external application GWS 320 receiving the document request sends an instruction to provide the eDoc. The processing device 110 receiving the instruction to provide the eDoc transmits the eDoc (which has been encrypted) and data in which a key for decoding the eDoc is encrypted with the public key of the external application server 400 (this data is referred to as key data) in association with each other to the external application GWS 320. The external application GWS 320 transmits the eDoc and the key data received from the processing device 110 to the external application server 400. The external application server 400 receives the eDoc and the key data from the external application GWS 320. The external application server 400 decodes the key data with a private key of the external application server 400 itself, so as to obtain a decoding key for decoding the eDoc. The external application server 400 decodes the eDoc with the decoding key so as to obtain plain data indicating the contents of the eDoc. Then, on the plain data, the external application server 400 executes processing relating to the requested function of the external application. The external application server 400 sends processing result data obtained as a result of the processing back to the external application GWS 320, and then deletes the plain data.

In the aforementioned flow of processing, the external application GWS 320 receives the eDoc and the key data from the processing device 110, but cannot decode the key data. After all, the external application GWS 320 cannot know the contents of the eDoc. Therefore, the contents of the eDoc are open only to the processing device 110 which has accepted registration of the eDoc, the user who has access permission to the eDoc, and the external application server 400 which performs processing on the eDoc.

When a function indicated by an application function ID in an application request data is processing on a metadata item of an eDoc, the external application server 400 sends a request to the external application GWS 320. The request includes a DID included in the application use request, and a metadata ID indicating the metadata item. The request is an example of a metadata request. The external application GWS 320 receiving the request sends a request including the DID and the metadata ID to the processing device 110 storing the eDoc designated by the DID. The processing device 110 sends, back to the external application GWS 320, a value of the metadata item specified by the combination of the DID and the metadata ID included in the request. The external application GWS 320 transmits the value of the metadata item received from the processing device 110, to the external application server 400. On the occasion of this transmission, the external application GWS 320 encrypts the value of the metadata item, and transmits data obtained by the encryption to the external application server 400. The data is an example of encrypted metadata. The external application server 400 decodes the received data to obtain the value of the metadata item, and uses the obtained value to execute processing relating to the requested function of the external application.

Each device of the creation terminal 102, the browsing terminal 104, the processing device 110, the local user ID server 152, the local DID server 154, the local metadata server 156, the user ID server 210, the DID server 220, the metadata server 230, the processing device management server 240, the external application GWS 320, etc. described above by way of example can be implemented by making a computer execute a program expressing a function as the device. Here, for example, the computer has, as hardware, a circuit configuration in which a microprocessor such as a CPU, a memory (primary storage) such as a random access memory (RAM), a read only memory (ROM), etc., a controller for controlling a fixed storage unit such as a flash memory or an SSD (solid state drive), an HDD (Hard Disk Drive), etc., various I/O (Input/Output) interfaces, a network interface for controlling connection with a network such as a local area network, etc. have been connected through a bus and the like. Programs described for the contents of processings of those functions are stored in the fixed storage unit such as the flush memory via the network or the like, and installed in the computer. The programs stored in the fixed storage unit are read on the RAM and executed by the microprocessor such as the CPU. Thus, the function module group described above by way of example can be implemented.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

REFERENCE SIGNS LIST 100 local system, 102 creation terminal, 104 browsing terminal, 108 local network, 110 processing device, 112 management information storage portion, 114 user DB, 116 document DB, 117 request acceptance portion, 119 data providing portion, 130 authentication device, 150 in-organization management system, 152 local user ID server, 154 local DID server, 156 local metadata server, 200 management system, 210 user ID server, 220 DID server, 230 metadata server, 240 processing device management server, 300 firewall, 320 external application GWS (gateway server), 322 request transfer portion, 324 server request processing portion, 326 processing result transfer portion, and 400 external application server.

What is claimed is:

1. An information processing system comprising: one or more internal devices that are connected to an internal network, the internal network being connected to an external network through a firewall; and an intermediation device that can communicate with the internal network and the external network; each of the internal devices comprising: a storage unit that stores one or more documents and metadata of each of the documents; and a request acceptance unit that accepts, from a user, a request for processing by an external server on the external network as to one of the documents stored in the storage unit, and transmits the accepted request to the intermediation device; the intermediation device comprising: a request transmission unit that receives the request, acquires, from the external network, at least one data item among a plurality of data items required by the external server to execute the request, acquires another one or more of the data items through the internal network from the internal device transmitting the request, and transmits requested data including the acquired plurality of data items to the external server; wherein the information processing system further comprising: an external device that is connected to the external network; wherein: the internal device accepts designation of at least one granted user as destinations to which permission to browse the document is granted, incorporates authorized user information indicating the designated at least one granted user into the metadata of the document in the storage unit, registers the metadata into the external device, and provides, to a browsing device of each of the at least one granted user, the document stored in the storage unit in a state where the document has been encrypted so that the at least one granted user can decode the encrypted document; the external device stores the metadata registered from the internal device; in a case where a request to browse the document within the browsing terminal is issued from a user, the browsing device examines whether the user is or is not included as one of the at least one granted user in the authorized user information included in the metadata of the document stored in the internal device or an accessible device of the external device, decodes and displays the document when the user is included as one of the at least one granted user, and inhibits the document from being displayed when the user is not included as one of the at least one granted user; document identification information of the document to be subjected to the processing is included in the plurality of data items; the intermediation device further comprises: a server request processing unit that carries out processing in which, when a document request including the document identification information is received from the external server receiving the request data, a providing instruction to provide the document corresponding to the document identification information to the external server is transmitted to the internal device storing the document, and the document encrypted and provided from the internal device in accordance with the providing instruction is transmitted to the external server; and the internal device comprises: a data providing unit that provides, to the intermediation device, the received document intended by the providing instruction in a state where the document has been encrypted so that the external server can decode the document but the intermediation device cannot decode the document.

2. The information processing system according to claim 1, wherein:
metadata specifying information specifying the metadata intended by the processing or a part of the metadata is included in the plurality of data items; and on receiving a metadata request including the metadata specifying information from the external server receiving the request data, the server request processing unit of the intermediation device acquires the metadata corresponding to the metadata specifying information or a part of the metadata from the external device or the internal device, converts the acquired metadata or a part thereof into encrypted metadata that can be decoded by the external server, and transmits the encrypted metadata or a part thereof to the external server.

3. The information processing system according to claim 2, wherein one of the plurality of data items is address information of the intermediation device, which is address information for the external network.

4. The information processing system according to claim 2, wherein the intermediation device further comprises: a processing result transmission unit that receives processing result data indicating a result of the processing and sent from the external server, and transmits the received processing result data through the internal network to the internal device transmitting the request corresponding to the processing.

5. The information processing system according to claim 2, wherein: a plurality of elements are included in the metadata of the document; document identification information of the document, and element identification information indicating, of the elements included in the metadata of the document, elements where processing result data as a result of the processing should be written, are included in the plurality of data items; and on receiving, from the external server, the document identification information, the element identification information and processing result data corresponding to the request data, the intermediation device makes control so that the processing result data is written into, of a group of elements of the metadata of the document corresponding to the document identification information stored in the storage unit of the internal device, elements corresponding to the element identification information.

6. The information processing system according to claim 2, wherein on receiving the request from a user, the intermediation device acquires, from a predetermined device on the internal network, information indicating whether the user has permission to use the intermediation device or not, and makes control to reject the request from the user when it is found from the acquired information that the user does not have permission to use the intermediation device.

7. The information processing system according to claim 2, wherein: the intermediation device acquires address data temporarily generated by the external server and indicating an address of the request data, from the external server via the external network; and the request transmission unit transmits, to the external server, the request data including the address data as one of the data items.

8. The information processing system according to claim 1, wherein one of the plurality of data items is address information of the intermediation device, which is address information for the external network.

9. The information processing system according to claim 1, wherein the intermediation device further comprises: a processing result transmission unit that receives processing result data indicating a result of the processing and sent from the external server, and transmits the received processing result data through the internal network to the internal device transmitting the request corresponding to the processing.

10. The information processing system according to claim 1, wherein: a plurality of elements are included in the metadata of the document; document identification information of the document, and element identification information indicating, of the elements included in the metadata of the document, elements where processing result data as a result of the processing should be written, are included in the plurality of data items; and on receiving, from the external server, the document identification information, the element identification information and processing result data corresponding to the request data, the intermediation device makes control so that the processing result data is written into, of a group of elements of the metadata of the document corresponding to the document identification information stored in the storage unit of the internal device, elements corresponding to the element identification information.

11. The information processing system according to claim 1, wherein on receiving the request from a user, the intermediation device acquires, from a predetermined device on the internal network, information indicating whether the user has permission to use the intermediation device or not, and makes control to reject the request from the user when it is found from the acquired information that the user does not have permission to use the intermediation device.

12. The information processing system according to claim 1 wherein:
the intermediation device acquires address data temporarily generated by the external server and indicating an address of the request data, from the external server via the external network; and the request transmission unit transmits, to the external server, the request data including the address data as one of the data items.

13. The information processing system according to claim 1, wherein one of the plurality of data items is address information of the intermediation device, which is address information for the external network.

14. The information processing system according to claim 13, wherein the intermediation device further comprises: a processing result transmission unit that receives processing result data indicating a result of the processing and sent from the external server, and transmits the received processing result data through the internal network to the internal device transmitting the request corresponding to the processing.

15. The information processing system according to claim 13, wherein: a plurality of elements are included in the metadata of the document; document identification information of the document, and element identification information indicating, of the elements included in the metadata of the document, elements where processing result data as a result of the processing should be written, are included in the plurality of data items; and on receiving, from the external server, the document identification information, the element identification information and processing result data corresponding to the request data, the intermediation device makes control so that the processing result data is written into, of a group of elements of the metadata of the document corresponding to the document identification information stored in the storage unit of the internal device, elements corresponding to the element identification information.

16. The information processing system according to claim 1, wherein the intermediation device further comprises: a processing result transmission unit that receives processing result data indicating a result of the processing and sent from the external server, and transmits the received processing result data through the internal network to the internal device transmitting the request corresponding to the processing.

17. The information processing system according to claim 1, wherein: a plurality of elements are included in the metadata of the document; document identification information of the document, and element identification information indicating, of the elements included in the metadata of the document, elements where processing result data as a result of the processing should be written, are included in the plurality of data items; and on receiving, from the external server, the document identification information, the element identification information and processing result data corresponding to the request data, the intermediation device makes control so that the processing result data is written into, of a group of elements of the metadata of the document corresponding to the document identification information stored in the storage unit of the internal device, elements corresponding to the element identification information.

18. The information processing system according to claim 1, wherein on receiving the request from a user, the intermediation device acquires, from a predetermined device on the internal network, information indicating whether the user has permission to use the intermediation device or not, and makes control to reject the request from the user when it is found from the acquired information that the user does not have permission to use the intermediation device.

19. The information processing system according to claim 1, wherein: the intermediation device acquires address data temporarily generated by the external server and indicating an address of the request data, from the external server via the external network; and the request transmission unit transmits, to the external server, the request data including the address data as one of the data items.

* * * * *